US012033820B2

(12) United States Patent
Beagan et al.

(10) Patent No.: US 12,033,820 B2
(45) Date of Patent: Jul. 9, 2024

(54) MODULAR VACUUM CIRCUIT INTERRUPTER

(71) Applicant: Southern States, LLC, Hampton, GA (US)

(72) Inventors: Lawrence B Beagan, Fayetteville, GA (US); Joseph Andreyo, Fayetteville, GA (US); Joseph R Rostron, McDonough, GA (US)

(73) Assignee: SOUTHERN STATES, LLC, Hampton, GA (US)

(*) Notice: Subject to any disclaimer, the term of this patent is extended or adjusted under 35 U.S.C. 154(b) by 62 days.

(21) Appl. No.: 17/859,076

(22) Filed: Jul. 7, 2022

(65) Prior Publication Data

US 2024/0013993 A1 Jan. 11, 2024

(51) Int. Cl.
*H01H 33/662* (2006.01)
*H01H 33/666* (2006.01)

(52) U.S. Cl.
CPC .... *H01H 33/66207* (2013.01); *H01H 33/666* (2013.01); *H01H 2033/6623* (2013.01); *H01H 2033/6665* (2013.01)

(58) Field of Classification Search
CPC ........... H01H 33/66207; H01H 33/666; H01H 33/022; H01H 33/42; H01H 33/662; H01H 2033/6623; H01H 2033/6665; H01H 33/143; H01H 33/14; H01H 31/30; H01H 9/047
USPC ....... 218/118, 119, 127, 134, 138, 139, 140, 218/153, 155; 200/48 R, 48 P, 48 A, 200/48 KB, 48 V
See application file for complete search history.

(56) References Cited

U.S. PATENT DOCUMENTS 3,532,842 A 10/1970 Fohrhaltz
3,602,668 A * 8/1971 Krajewski ............ H01H 33/124 218/8

(Continued)

FOREIGN PATENT DOCUMENTS

WO W0041199 * 7/2000 ............. H01H 33/60

OTHER PUBLICATIONS

I. A. Bean and T. E. Weber, HVDC Surface Flashover in Compressed Air for Various Dielectrics, Jun. 22, 2020.

*Primary Examiner* — William A Bolton
(74) *Attorney, Agent, or Firm* — Mehrman Law Office; Michael J. Mehrman

(57) ABSTRACT

An electric power disconnect switch and associated vacuum circuit interrupter with a modular, removable contactor unit housing a modular, removable vacuum bottle unit. The vacuum circuit interrupter may be mounted on a bracket adjacent to the jaws of a disconnect switch, where the blade of the disconnect switch moves the actuator arm of the vacuum circuit interrupter during operation of the disconnect switch. A technician carries a spare contactor unit to the disconnect switch location, where the technician removes and replaces the contactor unit. The vacuum circuit interrupter includes a separable connection between the drive unit housing and a contactor unit housing, which allows the contactor unit to be rotated with respect to the drive unit to unscrew the connecting rod of the contactor unit from the drive shaft of the drive unit. A replacement contactor unit is then installed and the circuit interrupter is returned to service.

20 Claims, 8 Drawing Sheets

(56) References Cited

U.S. PATENT DOCUMENTS

| | | | | |
|---|---|---|---|---|
| 4,150,270 | A * | 4/1979 | Zunick | H01H 33/66<br>218/138 |
| 6,172,317 | B1 | 1/2001 | Wristen | |
| 6,198,062 | B1 * | 3/2001 | Mather | H01H 33/022<br>218/120 |
| 6,888,086 | B2 | 5/2005 | Daharsh et al. | |
| 8,110,770 | B2 * | 2/2012 | Ichikawa | H01H 33/666<br>218/140 |
| 9,190,231 | B2 | 11/2015 | Borgstrom et al. | |
| 9,214,306 | B2 * | 12/2015 | Yoshida | H01H 33/565 |
| 10,148,081 | B2 * | 12/2018 | Rhein | H01H 33/124 |
| 10,262,819 | B2 * | 4/2019 | Nagatake | C22C 27/06 |
| 10,242,825 | B1 | 5/2019 | Kowalik et al. | |
| 2012/0103941 | A1 * | 5/2012 | Nakayama | H02B 13/0354<br>218/134 |
| 2020/0219688 | A1 * | 7/2020 | Rhein | H01H 33/66207 |
| 2022/0208491 | A1 * | 6/2022 | Dauksas | H01H 50/02 |

* cited by examiner

MODULAR VACUUM CIRCUIT INTERRUPTER

TECHNICAL FIELD

The present invention is directed to electric power systems and, more particularly, to a modular vacuum circuit interrupter with a modular, removable contactor unit containing a modular, removable vacuum bottle unit.

BACKGROUND

Circuit interrupters have been used for decades at disconnect switches and other types of switches throughout electric power systems. These circuit interrupters typically include contactors, such as butt or penetrating contactors, inside sealed containers housing a high dielectric medium, such as $SF_6$ or a vacuum. While $SF_6$ is a very effective dielectric medium, it is also a very powerful greenhouse gas. There is, therefore, an environmental interest in minimizing the use of $SF_6$ in circuit interrupters. Increasing interest in environmental protection has increased the technical attention paid to vacuum circuit interrupters.

The electric contactors inside vacuum circuit interrupters are designed to conduct electric arcing across the "arc gap" between the contacts when extinguishing electric currents flowing through the contacts. The arcing erodes the contacts over time, eventually requiring replacement of the contacts. Although the contacts themselves are considered to be sacrificial components requiring periodic replacement, the remaining components of the circuit interrupter are rugged and often capable of remaining in use for multiple contactor replacements. The vacuum circuit interrupters may therefore be rebuilt with replacement contacts when the existing set of contacts wears out. This typically requires removing the circuit interrupter from service and taking it to a repair shop, where the contacts are replaced. Because the contacts are enclosed inside a sealed vacuum bottle, the rebuild process requires specialized equipment and there is no practical way to replace the contacts in the field, requiring the entire vacuum circuit interrupter to be taken out of service while the unit is rebuilt.

In addition, as a result of extreme electric field stress imposed over very short distances, vacuum circuit interrupters occasionally fail due to arcing at locations other than across the arc gap between the contacts referred to as "flashover." For example, a vacuum circuit interrupter can fail by flashover across the vacuum bottle wall, which can destroy the vacuum bottle. As a result, repairing a failed vacuum circuit interrupter sometimes requires more extensive repairs than ordinary contact replacement. The electric power industry therefore has a continuing need for improved vacuum circuit interrupters.

SUMMARY

The present invention solves the problem described above through a vacuum circuit interrupter in or for an electric power disconnect switch. The interrupter includes a drive unit having a drive unit housing with a side surface extending in an axial direction from a top end to a bottom end, a drive mechanism positioned within the contactor unit housing with a drive shaft extending axially through the bottom end of the drive unit housing, and an actuator linkage operatively connected to the drive mechanism. The vacuum circuit interrupter also includes a separable contactor unit including a contactor unit housing having a side surface extending in an axial direction from a top end to a bottom end, a baseplate attached to the bottom end, and a vacuum bottle unit positioned within the contactor unit housing. The vacuum bottle unit includes a vacuum container enclosing a contactor with a connecting rod extending through a top end of the vacuum container. The drive shaft of the drive unit is separably connected to the connecting rod of the contactor unit for removing the contactor unit from the drive unit by disconnecting the bottom end of the drive unit from the top end of the contactor unit and rotating the contactor unit with respect to the drive unit to unscrew the connecting rod from the drive shaft. The vacuum bottle unit is then removed from the contactor unit by removing the baseplate from the contactor unit housing and sliding the vacuum bottle unit out the bottom of the contactor unit housing.

The drive unit may also include a lid removably attached to the top end of the drive unit housing for accessing the drive mechanism without further disassembling the drive unit. In addition, the contactor unit housing includes a tapered inner surface and the vacuum bottle unit has a compliant outer surface conforming to the tapered inner surface of the contactor unit housing to form a tight seal while also facilitating sliding the vacuum bottle unit out the bottom end of the contactor unit housing.

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DESCRIPTION OF ILLUSTRATIVE EMBODIMENTS

Figure 1A:
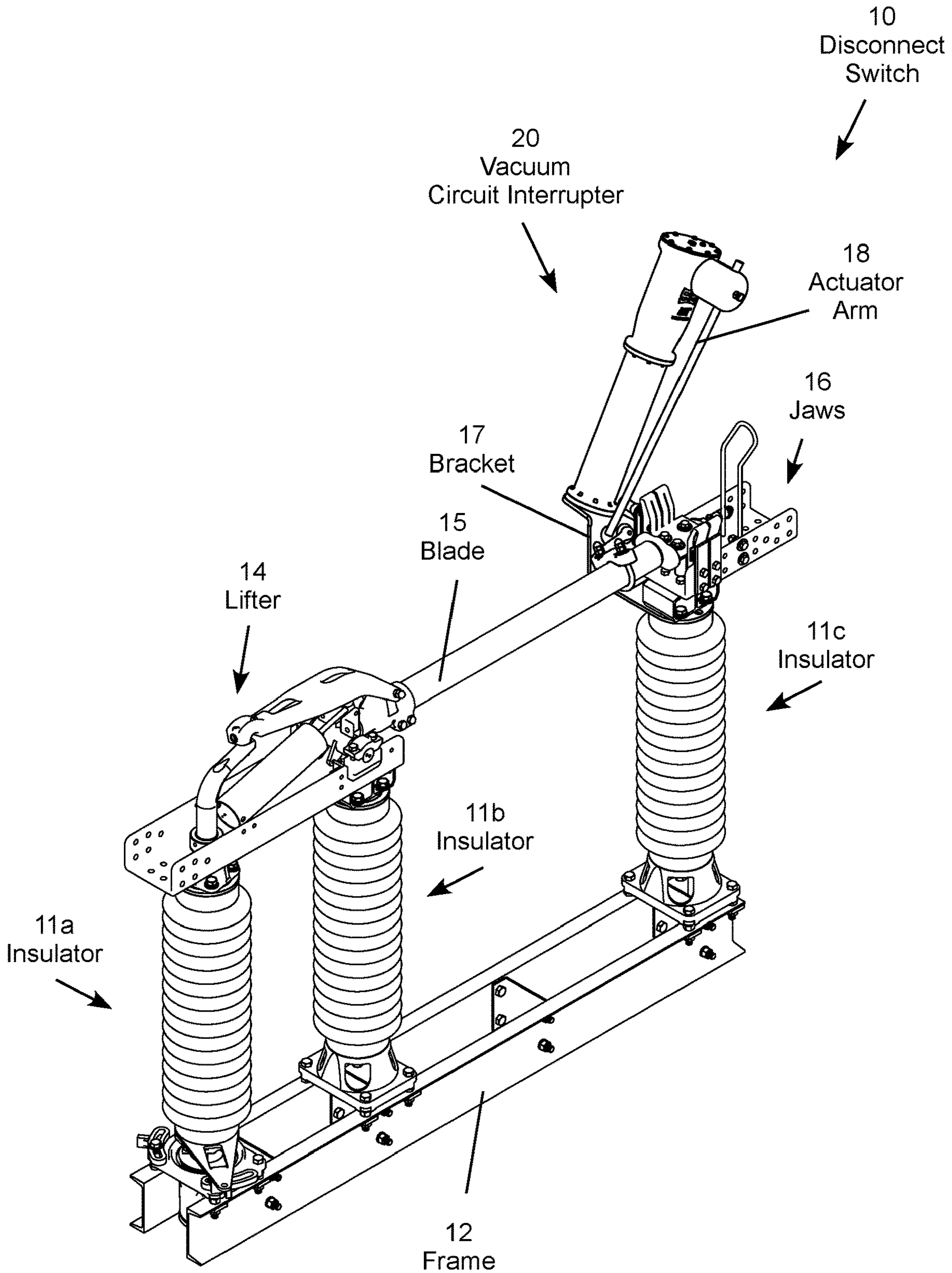
FIG. 1A is a perspective view of an electric power disconnect switch including a vacuum circuit interrupter in a closed position.

Embodiments of the present invention solve the problem described above through an electric power disconnect switch and associated vacuum circuit interrupter with a modular, removable contactor unit housing a modular, removable vacuum bottle unit. For example, the vacuum circuit interrupter may be mounted on a bracket adjacent to the jaws of a disconnect switch, where the blade of the disconnect switch moves the actuator arm of the vacuum circuit interrupter during operation of the disconnect switch. When the vacuum bottle unit requires replacement, a technician carries a spare contactor unit containing a replacement vacuum bottle unit to the disconnect switch location, where the technician removes and replaces the contactor unit. The vacuum circuit interrupter includes a separable connection between the drive unit housing and the contactor unit housing, which allows the contactor unit to be rotated with respect to the drive unit to unscrew the connecting rod of the contactor unit from the drive shaft of the drive unit. A replacement contactor unit is then installed at the disconnect switch location and the circuit interrupter is returned to service without removing or disassembling the drive unit.

The removed contactor unit is typically taken to a repair shop for inspection and repair. With the contactor unit separated from the drive unit, a baseplate is removed from the contactor unit housing allowing the vacuum bottle unit located inside the contactor unit housing to be removed intact. A complete replacement vacuum bottle unit is then installed and the rebuilt contactor unit returned to service. The removed vacuum bottle unit can then be inspected and repaired or discarded, as appropriate, in view of the condition of the vacuum bottle unit.

The vacuum bottle unit includes an insulation jacket surrounding a vacuum bottle wall reducing the likelihood of potentially damaging flashover across the vacuum bottle wall. The insulation jacket is compliant allowing it to conform to the tapered inner surface of the contactor unit housing to make a tight seal and facilitate removal of the vacuum bottle unit from the contactor unit housing. The drive unit of the vacuum circuit interrupter also includes a removable lid allowing access to the drive mechanism and associated linkage inside the drive unit housing at the disconnect switch location without removing or further disassembling the circuit interrupter.

Reference will now be made in detail to embodiments of the invention. In general, the same or similar reference numerals are used in the drawings and the description to refer to the same or like parts or steps. The drawings are in simplified form and are not to precise scale unless specifically indicated. The word "couple" and similar terms do not necessarily denote direct and immediate connections, but also include connections through intermediate elements or devices. Certain descriptors, such "first" and "second", "top and bottom", "upper" and "lower", or "inner" and "outer" may be employed to differentiate structures from each other. These descriptors are utilized as a matter of descriptive convenience and are not employed to implicitly limit the invention to any particular position or orientation.

Figure 1B:
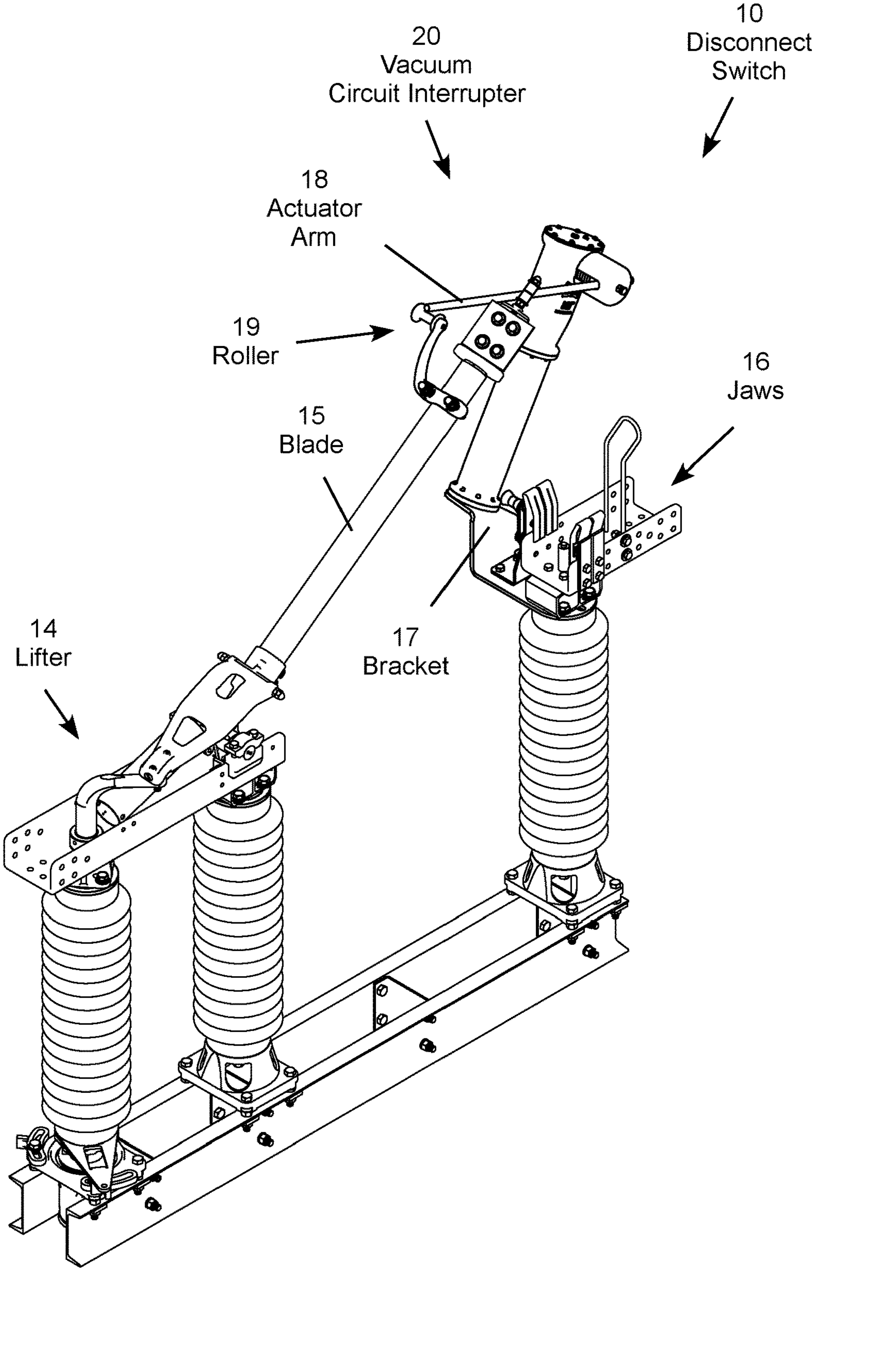
FIG. 1B is a perspective view of the disconnect switch in a partially open position.
Figure 1C:
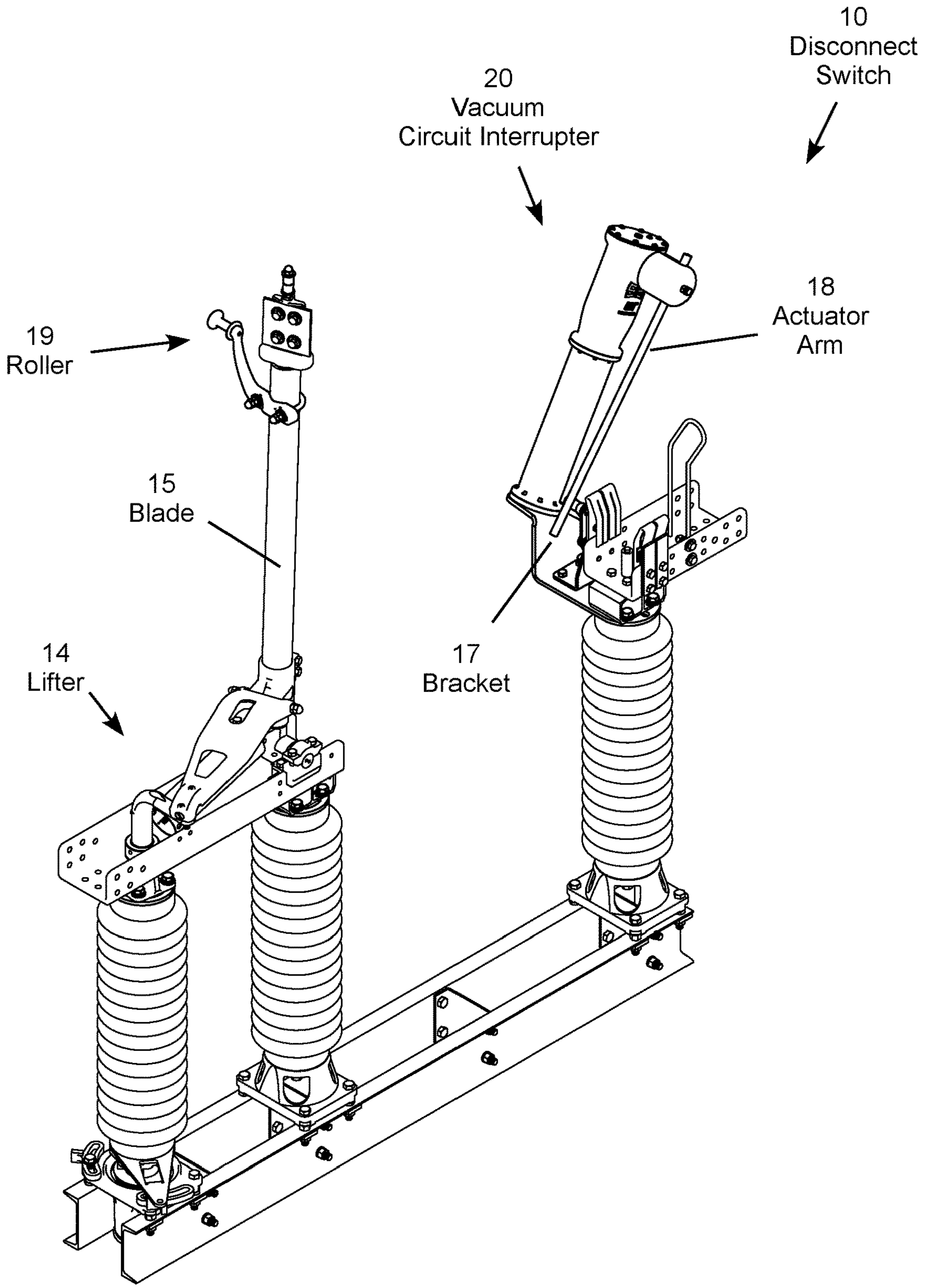
FIG. 1C is a perspective view of the disconnect switch in a fully open position.

FIG. 1A is a perspective view of an electric power disconnect switch 10 including a vacuum circuit interrupter 20 in a closed position. FIG. 1B shows the vacuum circuit interrupter 20 in a partially open position, and FIG. 1C shows the vacuum circuit interrupter 20 in a fully open position. The disconnect switch 10 includes three insulators 11*a*, 11*b* and 11*c* mounted on a frame 12. The insulators 11*a* and 11*b* support a lifter 14, while the insulator 11*c* supports a jaws 16. The lifter 14 raises and lowers a blade 15 into and out of engagement with the jaws 16 to close and open (disconnect) an electric power circuit in which the electric current flows through the lifter, blade and jaws. The lifter 14 may be operated by a motor or hand crank not shown in this illustration. The vacuum circuit interrupter 20 is mounted on a bracket 17 adjacent to and electrically connected to the jaws 16. Without the vacuum circuit interrupter 20, extinguishing an electric current flowing through the disconnect switch would cause damaging uncontrolled arcing, including potential restrikes, to occur between the blade 15 the jaws 16 as the blade separates from the jaws. The purpose of the vacuum circuit interrupter 20 is to divert the electric current through the interrupter to prevent arcing between the blade and jaws, instead extinguishing the electric current inside the vacuum circuit interrupter where controlled arcing occurs between contacts inside a high dielectric vacuum bottle unit located inside the circuit interrupter.

To do so, the vacuum circuit interrupter 20 includes an actuator arm 18 that comes into contact with, and is lifted by, a roller 19 attached to the blade 15 as the blade moves from the closed position to the open position. The roller 19 forms an electrical connection with the actuator arm 18 diverting the electric current through the vacuum circuit interrupter 20 once the blade 15 separates from the jaws 16. This prevents arcing between the blade 15 and the jaws 16, instead extinguishing the electric current inside the vacuum circuit interrupter 20 where controlled arcing occurs between the contacts inside the vacuum bottle unit located inside the circuit interrupter. It should be noted that FIG. 1C shows the actuator arm 18 returning to its original position after the roller 19 separates from the actuator arm. As a result, these figures illustrate utilization of the vacuum circuit interrupter 20 on the opening stroke of the bade 15. In an alternative embodiment, the actuator arm 18 remains raised after separating from the roller 19, allowing the vacuum circuit interrupter to operate on the closing stroke as well as the opening stroke of the blade 15.

Figure 2:
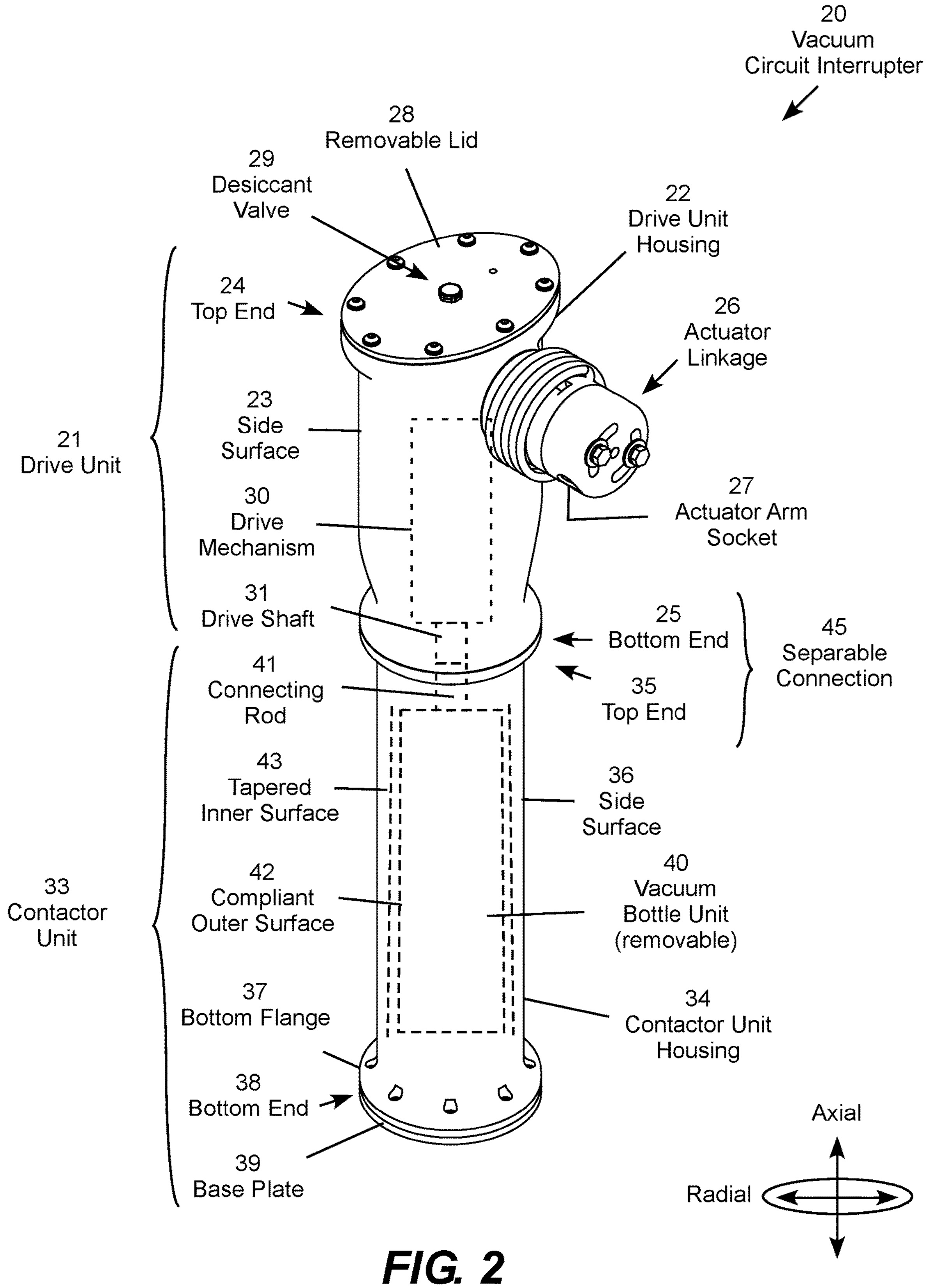
FIG. 2 is perspective view of the vacuum circuit interrupter.

FIG. 2 is perspective view of the vacuum circuit interrupter 20, which includes a drive unit 21 that is easily separable from a contactor unit 33. The drive unit 21 includes a drive unit housing 22 that is removably bolted to the contactor unit housing 34. The drive unit 21 also defines a side surface 23 that extends from a top end 24 to a bottom end 25. An actuator linkage 26 with an actuator arm socket 27 extends laterally from the side surface 23. A removable lid 28 is removably bolted the top end 24 providing access to the drive mechanism 30 on the inside of the drive unit housing 22 without further disassembly of the drive unit. The drive mechanism 30 is operated by an actuator arm, in this example the actuator arm 18 in FIGS. 1A-1C, received in the actuator arm socket 27 of the actuator linkage 26. The drive mechanism 30 extends and retracts a drive shaft 31 that extends through the bottom end 25 of the drive unit housing 22, where it separably attaches to the connecting rod 41 of the contactor unit 33 to drive the contacts inside the vacuum bottle unit 40.

The contactor unit 33 includes a contactor unit housing 34 with a side surface 36 that extends from a top end 35 to a bottom flange 37 with a bottom end 38, which is covered by a removable base plate 39. A removable vacuum bottle unit 40 located inside the contactor unit housing 34 includes a connecting rod 41 and a compliant outer surface 42 of a jacket fabricated from a flexible high dielectric insulator material, such as rubber, silicon, neoprene, polyester, polyethylene, various laminates, or a similar material. The contactor unit housing 34 includes a tapered inner surface 43 that makes a tight seal with the compliant outer surface 42 of the vacuum bottle unit 40 and facilitates removal of the vacuum bottle unit from the contactor unit housing. The bottom flange 37 includes holes for receiving bolts that connect the contactor unit housing 34 to a support surface, in this example the bracket 17 shown in FIGS. 1A-1C. The bottom end 25 of the drive unit housing abuts the top end 35 of the contactor unit housing, where they form a separable connection 45 allowing the drive unit 21 to be easily separated from the contactor unit 33 by removing the bolts holding the housings together and rotating the contactor unit housing with respect to the drive unit housing, to separate the drive shaft 31 from the connecting rod 41, without further disassembling the circuit interrupter 20. This is an advantage over conventional circuit interrupters allowing convenient, modular replacement of the contactor unit 33 without replacing the drive unit 21.

As is well known in the electric power industry, the drive mechanism 30 may be a toggle mechanism, a cam mechanism, or any other suitable type of motive mechanism for extending and retracting the drive shaft 31 at the speed desired for circuit interruption. The drive unit housing 22 and the contactor unit housing 34 are fabricated from a non-conductive electric insulation material, such as fiberglass, and may be covered by the familiar weather-shed "bells" often seen on high voltage insulators. The actuator linkage 26 is a spring tensioned mechanism that translates movement of the actuator arm to movement of the drive mechanism and may include latches and other features well known in the industry. The contactors inside the vacuum bottle unit 40 may, for example, be butt contactors or penetration contactors. The embodiments of the present invention are not dependent on these conventional features of the drive unit 21 or the contactor unit 33, which will not be described in greater detail.

Figure 3:
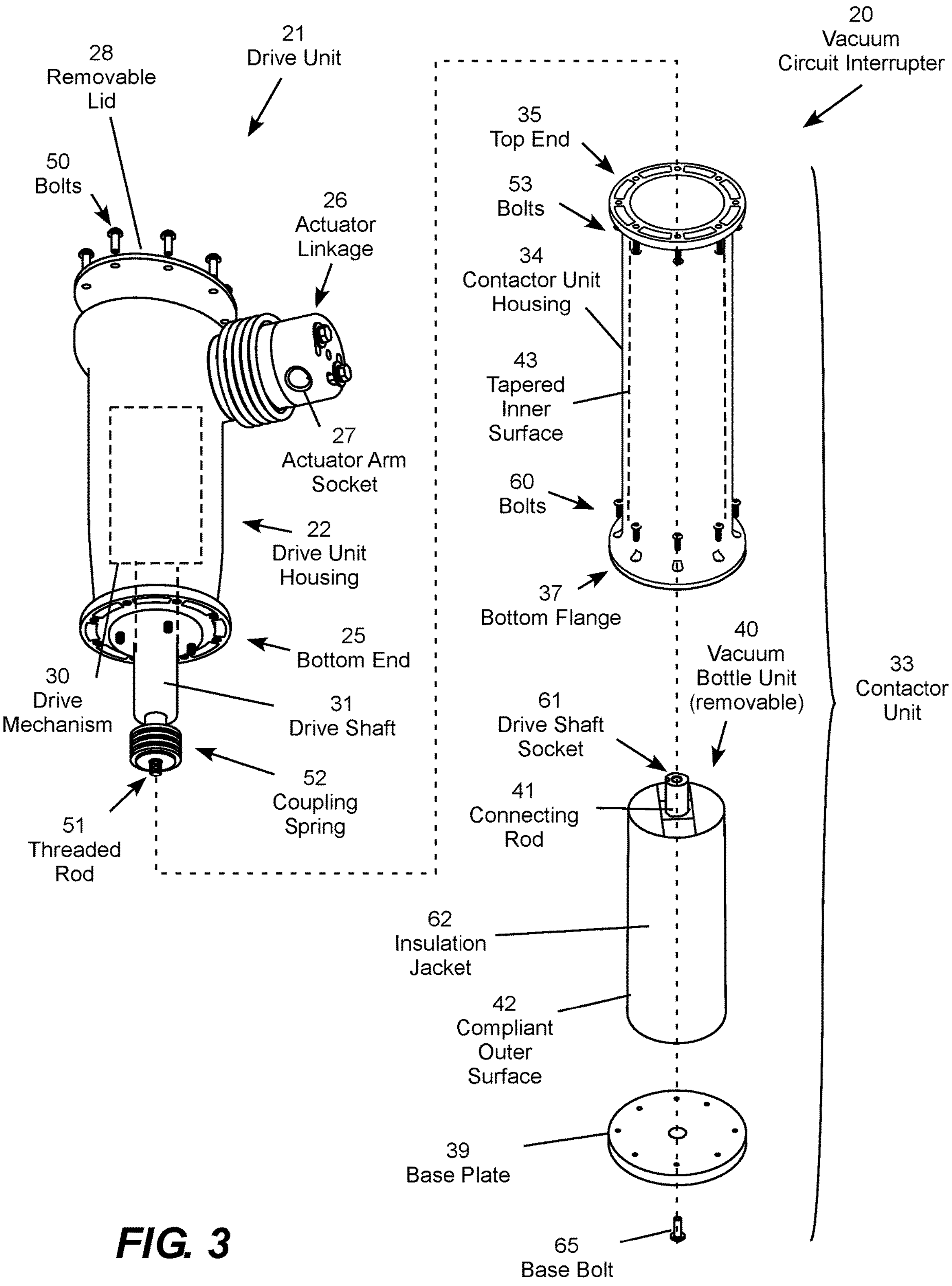
FIG. 3 is an exploded view of the vacuum circuit interrupter.

FIG. 3 is an exploded view of the vacuum circuit interrupter 20. This view shows the removable bolts 50 allowing the lid 28 to be removed to gain access to the drive mechanism 30 inside the drive unit housing 22 without further disassembling the vacuum circuit interrupter 20. This allows adjustment, calibration, part replacement and other service to be performed on the drive mechanism 30 and actuator linkage 26 while the vacuum circuit interrupter 20 remains in place, which is not possible with many other conventional circuit interrupters.

FIG. 3 also shows the threaded rod 51 on the bottom of the drive shaft 31 of the drive unit 21, the coupling spring 52, and the bolts 53 that removably connect the bottom end 25 of the drive unit to the top end 35 of the contactor unit 33. The threaded rod 51 releasably attaches the drive shaft 31 of the drive mechanism 30 to the drive shaft socket 61 at the top of the connecting rod 41 of the vacuum bottle unit 40. A technician separates the drive unit 21 from the contactor unit 33 by removing the bolts 53 and then rotating the contactor unit housing 34 with respect to the drive unit housing 22, which unscrews the threaded rod 51 from the drive shaft socket 61 at the top of the connecting rod 41 of the vacuum bottle unit 40. The contactor unit 33 can then be handled separately from the drive unit, typically by removing the existing contactor unit and replacing it with a new or rebuilt contactor unit. The technician may then take the removed contactor unit 33 to a repair shop where the vacuum bottle 40 unit is removed and discarded or replaced by a new or rebuilt vacuum bottle unit, as appropriate based on the condition of the vacuum bottle unit.

FIG. 3 also shows the bolts 60 that extend from the bottom flange 37 of the contactor unit housing 34 through the base plate 39 to removably attach the contactor unit housing to the support structure, in this example the bracket 17 shown in FIGS. 1A-1C. A base bolt 65 extends through the base plate 39 and attaches to the bottom of the vacuum bottle unit 40. Once the contactor unit housing 34 has been removed from support structure, the base bolt 65 is removed, which allows the base plate 39 to be removed. The vacuum bottle unit 40 can then be removed out the bottom of the contactor unit housing 34, which typically requires a puller tool to break the tight seal between the insulation jacket 62 on the outside of the vacuum container and the tapered inner surface 43 of the contactor unit housing.

Figure 4:
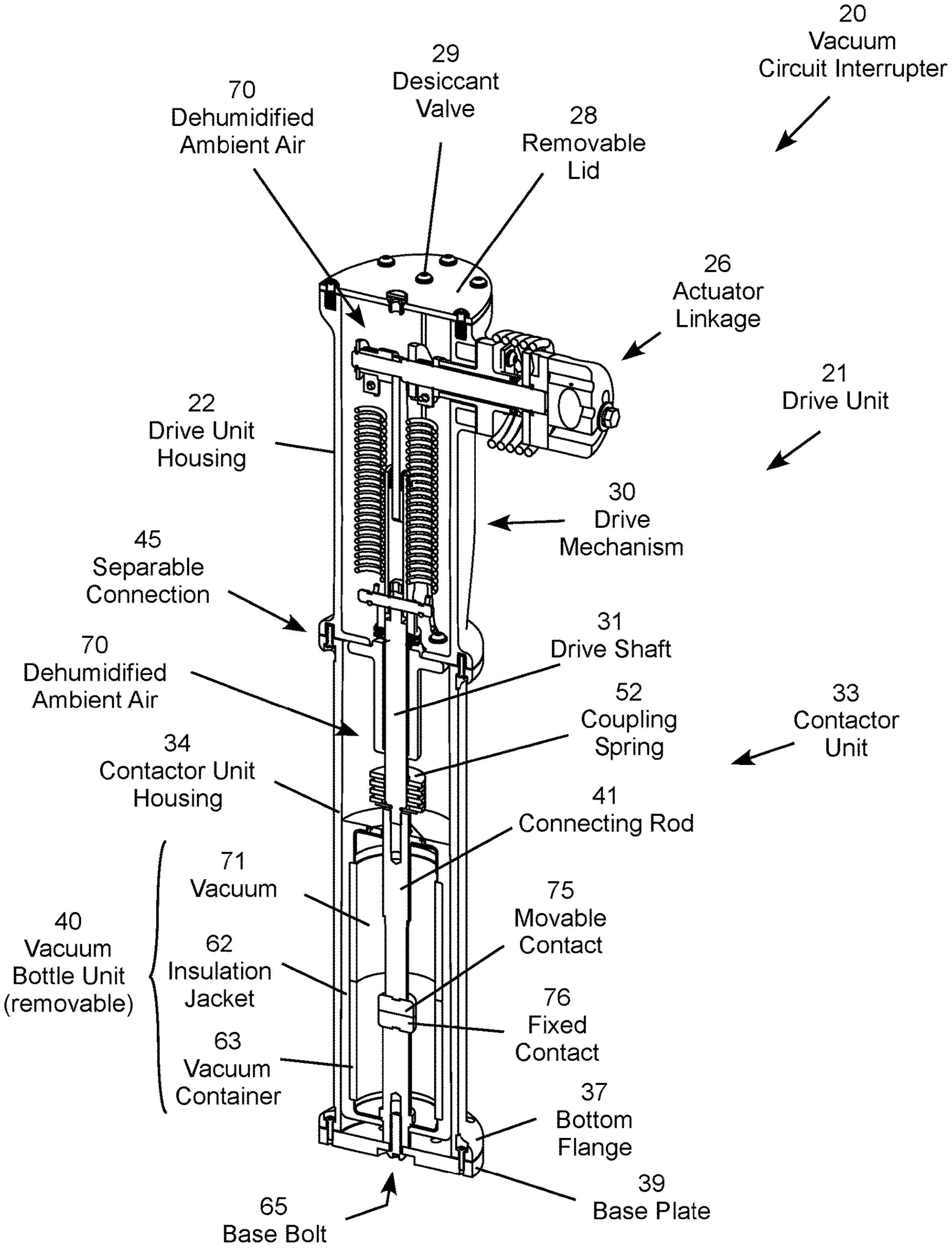
FIG. 4 is a cross-sectional view of the vacuum circuit interrupter.

FIG. 4 is a cross-sectional view of the vacuum circuit interrupter 20 prior to separation of the drive unit 21 from the contactor unit 33 at the separable connection 45. This view shows the components of the vacuum bottle unit 40 including an insulation jacket 62 around the outer surface of a vacuum container 63, which is filled with a high dielectric vacuum 71. The vacuum container 63 houses a movable contact 75 and a fixed contact 76, in this embodiment butt contacts. The drive mechanism 30 operates the connecting rod 41 to raise and lower the movable contact 75 at sufficient speed to open and close an electric circuit through the contacts. The contacts 75-76 create an arc gap when opening and closing the electric circuit giving rise to the need to occasionally replace the contactor unit 33 containing the vacuum bottle unit 40 without replacing the drive unit 21. In this embodiment, the base bolt 65 screws into the bottom of the fixed contact 76, which extends outside the bottom of the vacuum container 63.

This view also shows the desiccant valve 29 in the removable lid 28 of the of the drive unit 21. The desiccant valve 29 includes a hydrophobic filter, such as a polytetrafluoroethylene (PTFE) membrane, which results in dehumidified ambient air 70 inside the drive unit housing 22. Reducing the moisture content of the medium inside the housing helps to reduce corrosion and avoid condensation, which can cause flashover inside the housing. In this embodiment, the dehumidified ambient air 70 also communicates into the top portion of the interior of the contactor housing 34 above the vacuum container 63. The tight seal between the insulation jacket 62 and the inner surface 43 of the contactor unit housing prevents the dehumidified air 70 from entering into this area, further reducing the likelihood of potentially damaging flashover between the vacuum container 63 and other structures.

Figure 5:
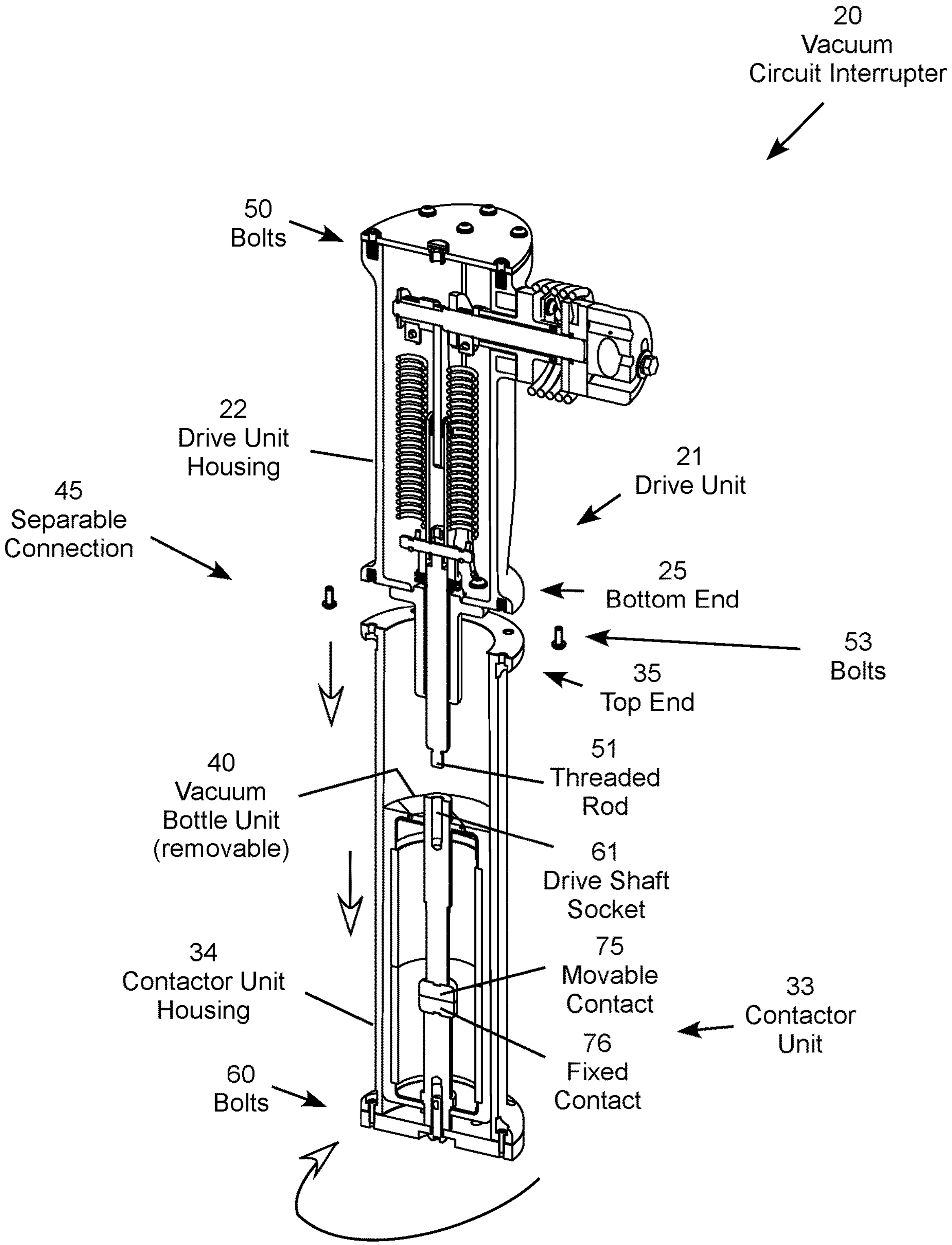
FIG. 5 is a cross-sectional view of the vacuum circuit interrupter illustrating a disassembly procedure.

FIG. 5 is a cross-sectional view of the vacuum circuit interrupter illustrating modular disassembly of the circuit interrupter 20. A technician dismounts the vacuum circuit interrupter 20 from its support surface, in this example the bracket 17 shown in FIGS. 1A-1C. The technician then removes the bolts 53 at the separable connection 45 between the bottom end 25 of the drive unit housing 22 and the top end 35 of the contactor unit housing 34. The technician then rotates the contactor unit housing 34 with respect to the drive unit housing 22, which unscrews the threaded rod 51 from the drive shaft socket 61 at the top end of the connecting rod 41 releasing the contactor unit housing 34 containing the vacuum bottle unit 40. To aid in this process, the technician can gain a little distance (e.g., about ¾ of an inch) at the separable connection 45 by pulling down on the contactor unit housing 34, which separates the contacts 75-76 enough to facilitate rotation of the contactor unit housing with respect to the drive unit housing. This fast and easy process removes the contactor unit 33 as a module from the drive unit 21 without further disassembly of either unit.

Figure 6:
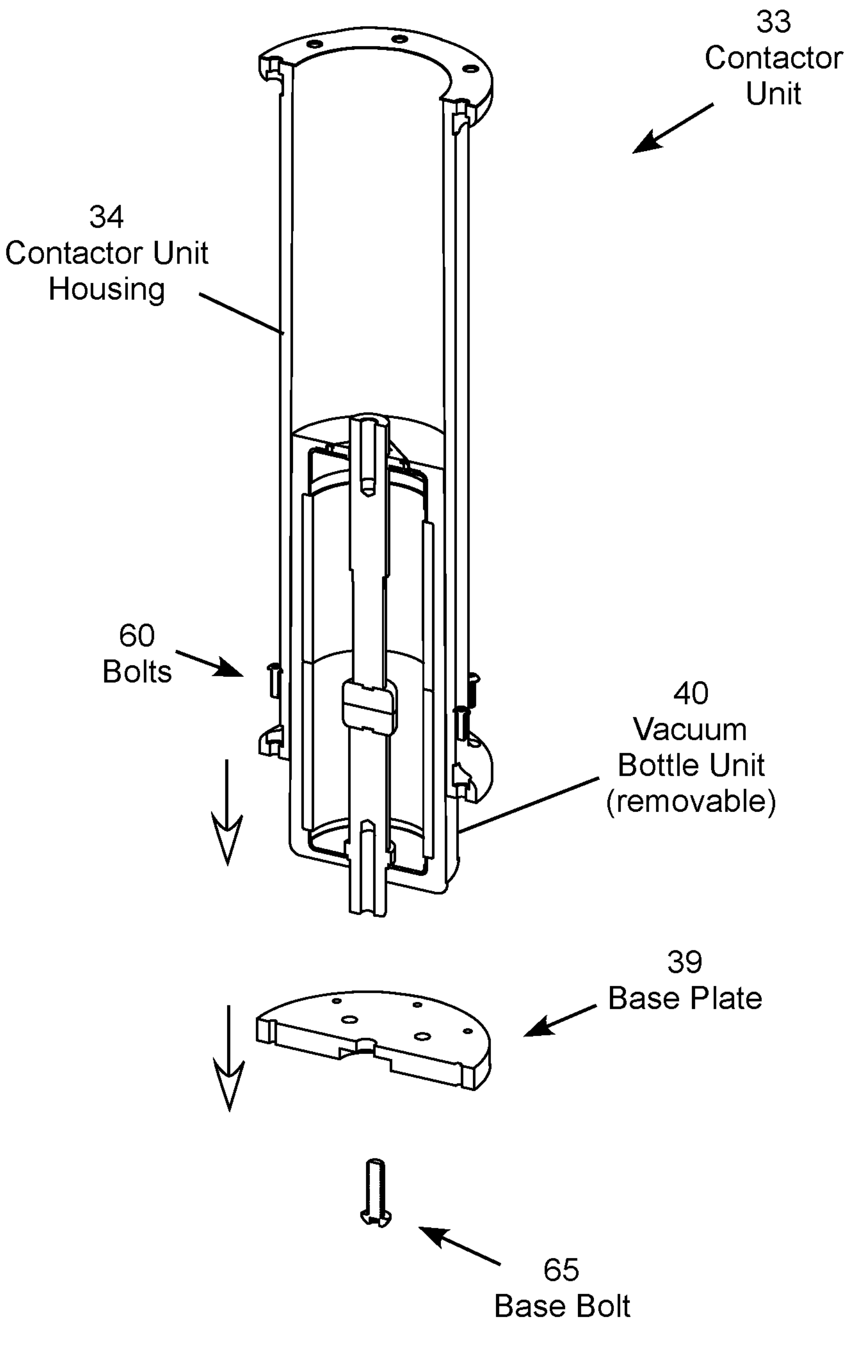
FIG. 6 is a cross-sectional view of a contactor unit further illustrating the disassembly procedure.

As shown in FIG. 6, once the contactor unit 33 is removed from the drive unit 21, the technician removes the base bolt 65 to release the base plate 39 from the bottom of the contactor unit housing 34. The technician then removes the vacuum bottle unit 40 out the bottom of the contactor unit housing 34, typically utilizing a puller tool to break the tight seal between the insulation jacket on the outside of the vacuum bottle and the tapered inner surface of the contactor unit housing.

Although particular aspects of representative embodiments have been shown and described in detail, it will be apparent to those skills that the invention is not limited to those precise embodiments, and that various modifications and variations can be made to the explicitly described embodiments without departing from the scope or spirit of the invention. The following clams are therefore intended to cover modifications and variations of the representative embodiments provided they come within the scope of the appended claims and their equivalents.

The invention claimed is:

1. A vacuum circuit interrupter, comprising:

a drive unit comprising a drive unit housing comprising a side surface extending in an axial direction from a top end to a bottom end, a drive mechanism positioned within the drive unit housing comprising a drive shaft extending axially through the bottom end of the drive unit housing, and an actuator linkage operatively connected to the drive mechanism;

a contactor unit comprising a contactor unit housing comprising a side surface extending in an axial direction from a top end to a bottom end, and a vacuum bottle unit positioned within the contactor unit housing comprising a vacuum container enclosing a contactor comprising a connecting rod extending through a top end of the vacuum container;

a desiccant valve resulting in dehumidified air inside the drive unit housing and the contactor unit housing to mitigate corrosion and condensation;

wherein the drive shaft is separably connected to the connecting rod for removing the vacuum bottle unit from the vacuum circuit interrupter by disconnecting the bottom end of the drive unit from the top end of the contactor unit, rotating the contactor unit with respect to the drive unit to unscrew the connecting rod from the drive shaft, and sliding the vacuum bottle unit out of the contactor unit housing.

2. The vacuum circuit interrupter of claim 1, further comprising an insulation jacket filling a space between the side surface of the contactor unit housing and a entire side surface of the vacuum container reducing of flashover.

3. The vacuum circuit interrupter of claim 1, wherein:

the contactor unit housing comprises a tapered inner surface;

the vacuum bottle unit comprises a compliant outer surface conforming to the tapered inner surface of the contactor unit housing to facilitate sliding the vacuum bottle unit out the bottom end of the contactor unit housing.

4. The vacuum circuit interrupter of claim 1, wherein a bottom end of the vacuum bottle unit is positioned adjacent to the bottom end of the contactor unit housing, and a baseplate is selectively removable from the bottom of the contactor unit housing, for removal of the vacuum bottle unit through the bottom of the contactor unit housing.

5. The vacuum circuit interrupter of claim 1, wherein the connecting rod of the contactor unit is connected to a moving contact of the vacuum bottle unit.

6. The vacuum circuit interrupter of claim 1, further comprising a base bolt extending through a baseplate and into a fixed contact of the vacuum bottle unit removably connecting the baseplate to the vacuum bottle unit.

7. The vacuum circuit interrupter of claim 1, wherein a drive rod of the actuator linkage extends radially through the side surface of the drive unit is operably connected to the drive mechanism.

8. The vacuum circuit interrupter of claim 1, wherein the vacuum bottle unit is removable from the vacuum circuit interrupter without further disassembling the drive unit or the contactor unit.

9. The vacuum circuit interrupter of claim 1, wherein the drive mechanism comprises a toggle mechanism.

10. An electric power disconnect switch comprising:

a jaws, a blade, and a lifter for moving the blade into and out of connection with the jaws;

a bracket positioned adjacent to the jaws;

a vacuum circuit interrupter mounted on the bracket comprising an actuator arm positioned to be moved by the blade to close and open an electric power circuit comprising the blade and the jaws;

wherein the vacuum circuit interrupter comprises:

a drive unit comprising a drive unit housing comprising a side surface extending in an axial direction from a top end to a bottom end, a drive mechanism positioned within the drive unit housing comprising a drive shaft extending axially through the bottom end of the drive unit housing, and an actuator linkage operatively connected to the drive mechanism;

a contactor unit comprising a contactor unit housing comprising a side surface extending in an axial direction from a top end to a bottom end, a baseplate attached to the bottom end, and a vacuum bottle unit positioned within the contactor unit housing comprising a vacuum container enclosing a contactor comprising a connecting rod extending through a top end of the vacuum container;

an insulation jacket filling a space between the side surface of the contactor unit housing and a entire side surface of the vacuum container reducing of flashover;

wherein the drive shaft is threadably connected to the connecting rod for removing the vacuum bottle unit from the vacuum circuit interrupter by disconnecting the bottom end of the drive unit from the top end of the contactor unit, rotating the contactor unit with respect to the drive unit to unscrew the connecting rod from the drive shaft, removing the baseplate from the contactor unit housing, and sliding the vacuum bottle unit out the bottom end of the contactor unit housing.

11. The electric power disconnect switch of claim 10, further comprising:

a desiccant valve resulting in dehumidified air inside the drive unit housing and the contactor unit housing to mitigate corrosion and condensation.

12. The electric power disconnect switch of claim 10, wherein:

the contactor unit housing comprises a tapered inner surface;

the vacuum bottle unit comprises a compliant outer surface conforming to the tapered inner surface of the contactor unit housing to facilitate sliding the vacuum bottle unit out the bottom end of the contactor unit housing.

13. A method for a modular vacuum circuit interrupter, comprising obtain a vacuum circuit interrupter, comprising a drive unit comprising a drive unit housing comprising a side surface extending in an axial direction from a top end to a bottom end, a drive mechanism positioned within the drive unit housing comprising a drive shaft extending axially through the bottom end of the drive unit housing, and an actuator linkage operatively connected to the drive mechanism, and a contactor unit comprising a contactor unit housing comprising a side surface extending in an axial direction from a top end to a bottom end, a baseplate attached to the bottom end, and a vacuum bottle unit positioned within the contactor unit housing comprising a vacuum container enclosing a contactor comprising a connecting rod extending through a top end of the vacuum container, wherein the drive shaft is threadably connected to the connecting rod, and wherein a bottom end of the vacuum bottle unit is positioned adjacent to the bottom end of the contactor unit housing, and the baseplate is selectively removable from the bottom of the contactor unit housing, for removal of the vacuum bottle unit through the bottom of the contactor unit housing;

installing the modular vacuum circuit interrupter on a bracket adjacent to a jaws of a disconnect switch;

removing the modular vacuum circuit interrupter from the bracket;

removing bolts connecting the drive unit housing to the contactor unit housing;

rotating the contactor unit housing with respect to the drive unit housing to unscrew the drive shaft from connecting rod;

separating the contactor unit from the drive unit;

removing the baseplate from the contactor unit;

sliding the vacuum bottle unit out the bottom end of the contactor unit.

14. The method of claim 13, wherein the drive unit further comprises a lid removably attached to the top end of the drive unit housing for accessing the drive mechanism without further disassembling the drive unit.

15. The method of claim 13, wherein:

the contactor unit housing comprises a tapered inner surface;

the vacuum bottle unit comprises an insulation jacket surrounding an outer portion of the vacuum bottle forming a compliant outer surface conforming to the tapered inner surface of the contactor unit housing to facilitate sliding the vacuum bottle unit out the bottom end of the contactor unit housing.

16. The method of claim 13, wherein the connecting rod of the contactor unit is connected to a moving contact of the vacuum bottle unit.

17. The method of claim 13, further comprising a base bolt extending through the baseplate and into a fixed contact of the vacuum bottle unit removably connecting the baseplate to the vacuum bottle unit.

18. The method of claim 13, wherein a drive rod of the actuator linkage extends radially through the side surface of the drive unit is operably connected to the drive mechanism.

19. The method of claim 13, further comprising removing the vacuum bottle unit from the vacuum circuit interrupter without further disassembling the drive unit or the contactor unit.

20. The method of claim 13, wherein the drive mechanism comprises a toggle mechanism.

* * * * *